(12) United States Patent
Sala Prat

(10) Patent No.: US 6,898,909 B2
(45) Date of Patent: May 31, 2005

(54) FLOORING

(76) Inventor: Ramon Sala Prat, Castanyera, 31, Guissona, Lields E-25240 (ES)

( * ) Notice: Subject to any disclaimer, the term of this patent is extended or adjusted under 35 U.S.C. 154(b) by 141 days.

(21) Appl. No.: 09/948,613

(22) Filed: Sep. 10, 2001

(65) Prior Publication Data

US 2002/0029536 A1 Mar. 14, 2002

(51) Int. Cl.$^7$ ................................................ E04B 1/70
(52) U.S. Cl. .................. 52/302.4; 52/169.5; 52/169.14; 119/450; 119/509; 119/529; 119/530
(58) Field of Search ............................... 52/251, 302.1, 52/302.3, 169.5, 169.11, 169.14, 302.4, 660; 119/444, 450, 509, 522, 529, 530; 210/150, 170, 293, 488, 496

(56) References Cited

U.S. PATENT DOCUMENTS

| | | | | |
|---|---|---|---|---|
| 2,874,844 A | * | 2/1959 | Wanner | |
| 4,231,325 A | * | 11/1980 | Parks | 119/28 |
| 4,703,597 A | * | 11/1987 | Eggemar | 52/220 |
| 4,795,555 A | * | 1/1989 | Wurster | 210/150 |
| 5,327,737 A | * | 7/1994 | Eggemar | 62/66 |
| 5,477,654 A | * | 12/1995 | Weelink | 52/664 |
| 5,511,346 A | * | 4/1996 | Kenworthy | 52/169.5 |
| 5,615,525 A | * | 4/1997 | Kenworthy | 52/169.5 |
| 5,934,828 A | * | 8/1999 | Hu et al. | 405/43 |
| 6,021,646 A | * | 2/2000 | Burley et al. | 62/235 |
| 6,247,874 B1 | * | 6/2001 | Hu | 405/43 |

FOREIGN PATENT DOCUMENTS

| | | |
|---|---|---|
| EP | 609581 A | 8/1994 |
| ES | 8101843 A | 12/1980 |
| ES | 285947 A | 12/1985 |
| ES | 1034883 A | 2/1997 |
| ES | 2131585 A | 8/1999 |
| GB | 2089391 A | 6/1982 |

* cited by examiner

Primary Examiner—Carl D. Friedman
Assistant Examiner—Yvonne M. Horton
(74) Attorney, Agent, or Firm—Pravel Intellectual Property Law, P.C.; James W. Pravel

(57) ABSTRACT

Improved flooring is disclosed that is formed by concrete slabs (1) with several parallel ribs (11) on the upper surface, between which there are longitudinal channels (12) connected with a main channel (2) laid transversally, in relation with one of the ends of the concrete slabs (1), and which ends in an outside connection (3). The ribs (11) have a thickened part (13) on the upper edge with an inner hole (15) for the circulation of hot water. Between the thickened parts (13) there are some grooves (15). The flooring is manufactured on site or by means of prefabricated slabs.

14 Claims, 2 Drawing Sheets

FLOORING

FIELD OF THE INVENTION

This invention refers to flooring for use in buildings, consisting of concrete slabs with longitudinal channels that are linked to a main channel. These concrete slabs have longitudinal holes that connect between each other, forming a circuit for the circulation of hot water.

BACKGROUND TO THE INVENTION

The flooring of certain buildings needs underground channels for heating or for conductions, such as electric lines. Some buildings are built with underfloor heating by means of hot water circulation; many industrial buildings must lay underfloor electric cables to supply electricity to certain workplaces; and in industrial animal farms, underground ducts are needed for the disposal of faeces and drain cleaning water. For example, in the case of industrial animal farms, floors are currently provided with grids, generally wooden or metal, mounted between the girders and columns, over an underground pit.

These floors make cleaning tasks much easier compared to other floors used previously, as animal urine and faeces fall through the grid to the underground pit where they are collected.

The grids of these floors are easily cleaned with pressure water, but other hygienic problems arise, as animals are permanently over the pit, inhaling the gases emitted by the accumulated faeces in the pit.

Cleaning and disinfecting the pit is another problem of this type of floor. As the pit has an elevated surface and a large amount of manure accumulates inside, even if pressure water is driven through the upper grid, it only cleans certain areas and does not scale the dry manure crust stuck to the walls of the pit.

SUMMARY OF THE INVENTION

The improved flooring, which is the purpose of this invention, presents certain building features aimed at simplifying the tasks that must be carried out on the floor, such as providing underground ducts or cleaning the floor, significantly improving convenience or required environmental or hygienic conditions.

This flooring is formed by concrete slabs provided with several parallel ribs on the upper surface, between which there are some longitudinal channels to conduct cables, pipes, etc. for homes or industrial buildings, or, in the case of animal farms, for the disposal of urine and faeces. These longitudinal channels reach a main channel laid transversally in relation with one of the ends of the concrete slabs and which leads to an outdoor connection.

The upper edge of the ribs provided in the concrete slabs has a thickened part forming the first part of the floor. In the case of homes or industrial buildings, this first part of the floor is covered as required, e.g. linoleum, parquet or ceramic tiles, while in the case of farms it is the final floor. Between the thickened parts there are some longitudinal grooves forming the inlets of the respective longitudinal channels.

The thickened part of the ribs enables longitudinal channels to have a greater width than the longitudinal grooves. This layout is particularly useful in animal farms, as animals cannot push their legs into them.

These longitudinal grooves may have a variable width depending on the circumstances: types of cables or pipes, or type of animals in the farm. In any event, this width is sufficient to enable tasks such as the distribution of cables or the introduction of pressure water through the longitudinal channels in order to make the conduction of urine and faeces to the collecting channel and cleaning tasks easier.

The main advantages of this flooring are:

A) In the case of homes or industrial buildings,
  1. The hot water heating circuit is installed when the floor is laid,
  2. A hole can be drilled in any part of the floor to insert electric cables up to the main channel, offering total versatility in accessing the electricity supply.

B) In the case animal farms:
  1. Animals do not stand over a pit accumulating urine and faeces, as is the case in other installations, substantially improving hygienic conditions of animals.

According to the invention, both the concrete slabs and the inner channel or channels, will be slightly longitudinally slanted. This does not impair the access of cables and it makes the conduction of urine and faeces to the disposal duct easier.

Another feature of this invention is that the ribs are provided with longitudinal holes in the thickened parts, which connect between each other or with the holes of the other slabs forming the floor. These form a suitable circuit to introduce and circulate hot water when heating is required.

The longitudinal channels may have a lower opening in the end of the slab resting over the main channel. The purpose of this opening is to form a sufficiently wide port to ensure, in the case of industrial animal farms, the discharge of urine and faeces inside the channel, when two facing slabs match, which occurs when the floor is longer than the length of the slabs. In this way, the floor defined by both slabs will be continuous or will have a slight separation at the junction, while the above mentioned openings will ensure the disposal of urine and faeces from the longitudinal channels of each slab into the common collector channel.

The concrete slabs may be prefabricated or formed directly in their final location by means of the techniques known as lost formwork or using a continuous concrete machine.

PREFERRED EMBODIMENT OF THE INVENTION

Figure 1:
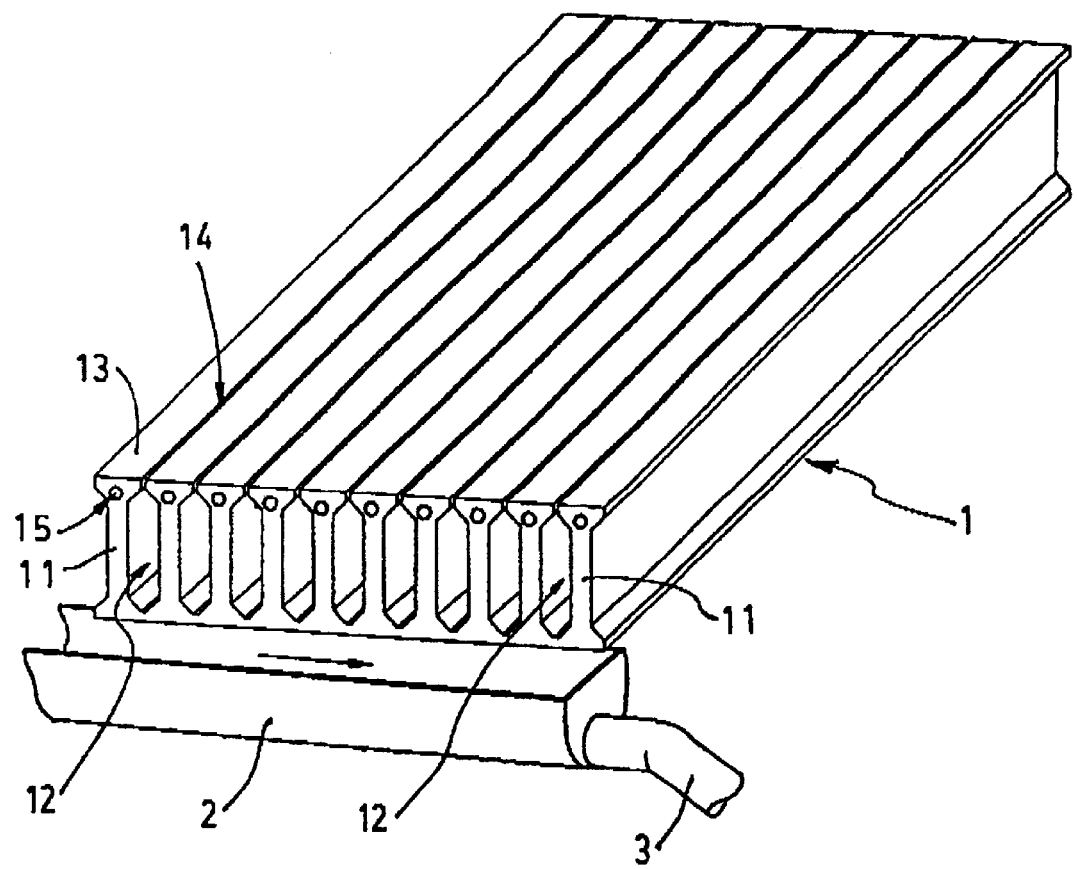
FIG. 1 shows a perspective view of one of the concrete slabs forming the flooring and a section of the longitudinal channel ending in the corresponding main channel when this is a disposal conduit.
Figure 2:
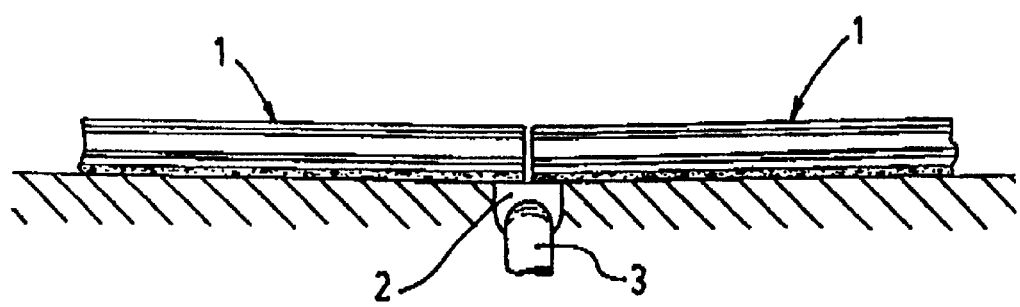
FIG. 2 shows a side view of the example described in the previous figure, sectioning the slab longitudinally along a vertical plane.

As shown in the above figures, the improved flooring is formed by concrete slabs (1) with parallel ribs (11) on their upper surface, between which there are longitudinal channels (12). These ribs (11) have a thickened part (13) on their upper edge forming the first phase of the flooring. Between the thickened parts (13) there are some grooves (14), narrower than the channels (12). The purpose of these grooves (14) is to enable access of cables, pipes, etc., or the disposal of faeces and urine inside the channels (12) and the introduction of pressure water in order to help the conduction of urine and faeces towards a main channel (2) transversally laid with regard to the channels (12), in relation with one of the ends of the slabs (1), and under it.

Both the slabs (1) and the main channel or channels (2) will be slightly longitudinally slanted, if applied in animal farms, in order to help the conduction of urine and faeces towards a disposal conduit (3) adapted over the lower end of the channel (2) and which forms an outlet towards a general collector not shown in the figures.

As shown in FIG. 1, the ribs (11) have longitudinal holes (15) in the thickened part (13) which join forming a circuit for the circulation of hot water to warm up room temperature.

Figure 3:
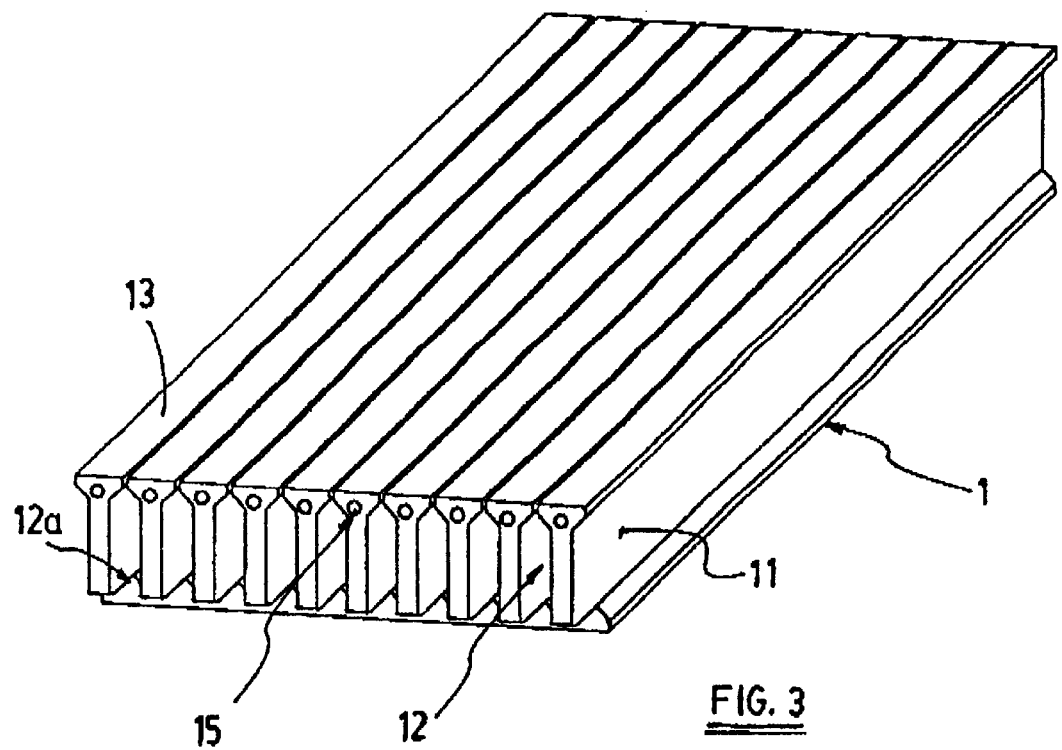
FIG. 3 shows a variation of the slab, provided with a lower opening in one of the ends of the longitudinal channels.
Figure 4:
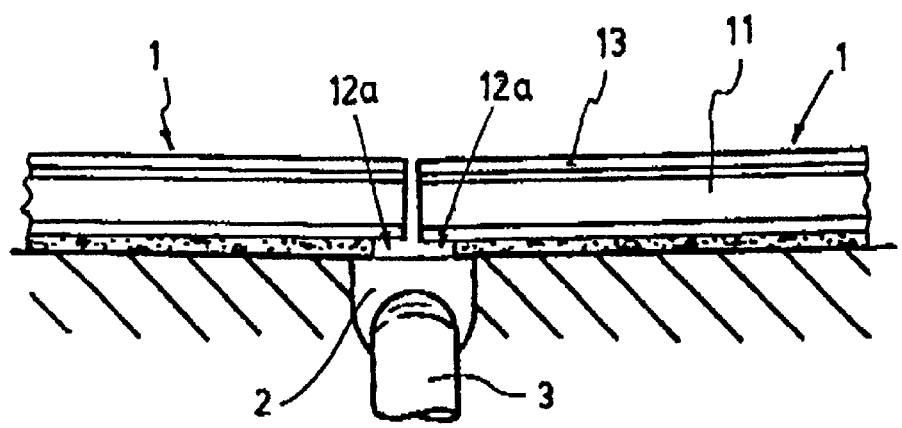
FIG. 4 shows a side view of two facing slabs as the one indicated in FIG. 3, longitudinally sectioned along a vertical plane and resting over a common collector channel.

In the variation shown in FIGS. 3 and 4, longitudinal channels (12) present a lower opening (12a) in the end of the slab (1) which rests on the collector channel (2). The purpose of this opening is to define a port wide enough to ensure the discharge of urine and faeces inside the channel (2), when two facing slabs (1) must be placed, as shown in FIG. 4, in order for the floor to be longer than the length of each one of the slabs.

FIG. 4 also shows the first layer (22) of the floor (1), which may be constructed for example, of linoleum, parquet, or ceramic tile.

Following current techniques, concrete slabs (1) are preferably manufactured on site by means of a continuous concrete machine which, at a constant speed, high vibrating power and highly resistant concrete, builds the detailed section, enabling the heating pipe to be inserted longitudinally together with reinforcements or other sections, in the direction of manufacture.

What is claimed is:

1. Improved flooring constructed of substantially unitary horizontal planar slabs (1) of in combination with longitudinal channels (12) and a main channel (2); said planar slabs (1) having multiple parallel ribs (11) on an upper surface, between which said longitudinal channels (12) are positioned for the conduction of cables or liquids towards said main channel (2), said main channel (2) is positioned proximate to and in communication with one of the ends of said slabs (1), and which ends in an outdoor connection conduit (3); said ribs (11) having a thickened part (13) on the upper edge which forms the first phase of the floor; substantially continuous longitudinal grooves (14) are positioned between said thickened parts (13), which form the access ports to said respective longitudinal channels (12).

2. Improved flooring according to claim 1, wherein a plurality of said substantially horizontal and planar slabs (1) are joined together, one end to the other, to form a continuous flooring.

3. Flooring, according to claim 1, wherein said slab is constructed of concrete.

4. Flooring, according to claim 3, wherein said concrete slabs (1) and said main channel (2) are slightly slanted longitudinally to make the conduction of liquids towards said disposal conduit (3) easier.

5. Flooring, according to claim 1, wherein said thickened parts (13) of the ribs (11) have longitudinal holes (15) that connect between each other, and which form a circuit for the circulation of hot water.

6. Flooring, according to claim 1, wherein said longitudinal channels (12) lower opening (12a) in the end of the slab (1) which rests on the main channel (2).

7. Flooring, according to claim 3, wherein said concrete slabs (1) are formed directly on site with techniques selected from the group consisting of continuous concreting and lost framework.

8. Continuous flooring, according to claim 2, wherein said thickened parts (13) of the ribs (11) have longitudinal holes (15) that connect with the longitudinal holes of the other said substantially horizontal and planar slabs (1), and which form a circuit for the circulation of fluid.

9. Flooring, according to claim 3, wherein said concrete slabs (1) are prefabricated with techniques selected from the group consisting of continuous concreting and lost framework.

10. Flooring, according to claim 1, wherein a covering is applied to the upper surface of said slab.

11. Flooring, according to claim 10, wherein said covering is linoleum.

12. Flooring, according to claim 10, wherein said covering is parquet.

13. Flooring, according to claim 10, wherein said covering is comprised of ceramic tiles.

14. Improved continuous flooring, according to claim 8, wherein said circulated fluid is hot water.

* * * * *